April 18, 1961 P. E. LUTKE 2,980,203
CHOKE FILTER
Filed June 26, 1957
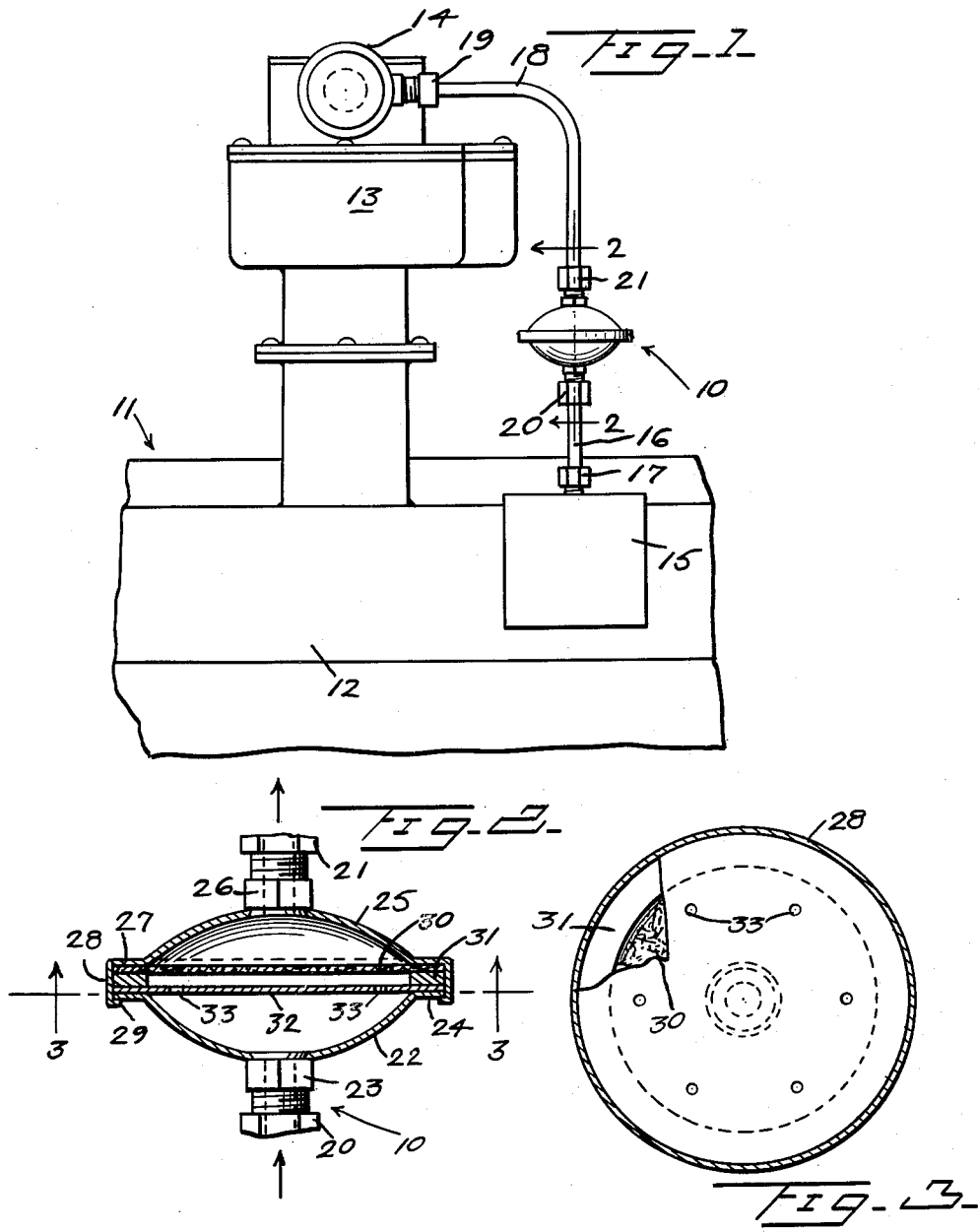
INVENTOR
Peter E. Lutke
BY Kimmel & Crowell
ATTORNEYS

United States Patent Office 2,980,203
Patented Apr. 18, 1961

2,980,203
CHOKE FILTER
Peter Edward Lutke, P.O. Box 97, City Service Oil Company Camp, about three miles west of Hobbs, N. Mex.
Filed June 26, 1957, Ser. No. 668,113
1 Claim. (Cl. 183—44)

The present invention relates to choke filters, and more particularly to filters used for filtering the air in automatic choke heat control lines.

The primary object of the invention is to provide an air filter for attachment in the air line extending from the heat riser of an exhaust manifold to the automatic choke of the carburetor.

Another object of the invention is to provide an air filter of the class described above which can be readily attached to existing air lines without modification of the engine.

In present day equipment, the air passing from the heat riser of the exhaust manifold upwardly to the carburetor to control the operation of the carburetor choke often passes dirt and other foreign material into the choke blocking the choke from efficient operation. With the present invention, the stoppage of the choke operation due to dirt and foreign material is completely eliminated and the effective life of the automatic choke is materially lengthened.

Other objects and advantages will become apparent in the following specification when considered in the light of the attached drawings, in which:

Figure 1 is a side elevation of the invention shown attached to an engine, with the engine being broken away for convenience of illustration.

Figure 2 is an enlarged vertical cross-section taken along the line 2—2 of Figure 1, looking in the direction of the arrows.

Figure 3 is a horizontal cross-section taken along the line 3—3 of Figure 2, looking in the direction of the arrows.

Referring now to the drawings in detail wherein like reference characters indicate like parts throughout the several figures, the reference numeral 10 indicates generally a filter constructed in accordance with the invention.

The filter 10 is used in conjunction with an internal combustion engine, generally indicated at 11, having an exhaust manifold 12, and a carburetor 13 controlled by an automatic choke 14. A manifold adapter 15 of conventional construction is arranged in overlying relation on the exhaust manifold 12 and has a conduit 16 connected thereto by a fitting 17, as is shown in Figure 1.

The automatic choke 14 of the carburetor 13 has a conduit 18 connected thereto by a fitting 19 and arranged in axial alignment with the conduit 16. The filter 10 is connected to the conduit 16 by a fitting 20 and to the conduit 18 by a fitting 21, as shown in Figures 1 and 2.

The filter 10 comprises a dome shell 22 having a hollow threaded boss 23 formed thereon for cooperation with the fitting 20. The shell 22 has a flat ring 24 formed on its outer edge and extending perpendicularly to the axis of the shell 22.

A second shell 25 is also of a dome shape configuration and provided with a hollow boss 26 centrally thereof to cooperate with the fitting 21. The shell 25 has a flat ring 27 integrally formed with the peripheral edge thereof and extending perpendicularly to the axis of the shell 25.

The shell 25 has a flange 28 integrally formed with the peripheral edge of the ring 27 and extending perpendicularly thereto oppositely to the hollow boss 26. The flange 28 encompasses the flat ring 24 and is crimped at 29 inwardly to secure the ring 24 and the shell 22 to the shell 25.

The flat ring 24 and the flat ring 27 of the shells 22 and 25, respectively, are arranged in parallel spaced apart relation.

A fibrous disc of filter material 30 is positioned between the flat rings 24 and 27, respectively, and engages peripherally the flange 28. A spacer washer 31 is positioned adjacent the flange 28 in contact with the filter 30, as can be seen in Figure 2.

An asbestos heat spreader disc 32 is positioned between the rings 24, 27 and peripherally contacts the flange 28. The asbestos disc 32 is engaged against the opposite side of the spacer washer 31 and is secured between the ring 24 and the spacer washer 31. The asbestos disc 32 is provided with a plurality of apertures 33 through which the air passes.

The porous filter material 30 is of a nature that air passing through the apertures 33 can pass through the filter material and into the conduit 18 to reach the automatic choke 14.

The use of the asbestos heat deflector 32 on the manifold side of the filter 10 and the spacing washers 31 create a chamber and an even flow of hot air over the filter material 30 so as to prevent the filter material 30 from being burned by the hot air passing from the conduit 16 into a concentrated spot thereon.

Having thus described the preferred embodiment of the invention, it should be understood that numerous structural modifications and adaptations may be resorted to without departing from the scope of the appended claim.

What is claimed is:

An air filter for use with an internal combustion engine including a carburetor, an exhaust manifold, an automatic choke for said carburetor, a manifold adapter overlying said manifold, and a conduit connecting said automatic choke to said adapter, said air filter adapted to be positioned in the conduit, said air filter comprising a pair of confronting domed shells each having a diameter substantially in excess of its height, and each being provided with a peripheral flange, a spacing washer positioned between said flanges, a porous filtering disc positioned between one of said flanges and said washer, a perforate asbestos heat distributing disc between the other of said flanges and said washer, said heat distributing disc being adapted to be positioned between said filtering disc and the exhaust manifold, and a marginal flange integral with and perpendicular to one of said first-mentioned flanges, said marginal flange being crimped inwardly to engage the other of said first-mentioned flanges clampingly to hold said spacing washer, said filtering disc and said heat distributing disc between said flanges centrally of the chamber formed by said confronting domed shells.

References Cited in the file of this patent
UNITED STATES PATENTS

| 887,988 | Wakley et al. | May 19, 1908 |
| 1,716,479 | Bilsky | June 11, 1929 |
| 2,125,899 | Ericson | Aug. 9, 1938 |
| 2,139,355 | Coffey | Dec. 6, 1938 |
| 2,139,356 | Coffey | Dec. 6, 1938 |
| 2,325,372 | Coffey | July 27, 1943 |

FOREIGN PATENTS

| 47,111 | Austria | 1911 |